United States Patent [19]

Charondiere

[11] Patent Number: 4,958,953

[45] Date of Patent: Sep. 25, 1990

[54] EXPANDABLE CONNECTOR TO AXIALLY JOIN TUBULAR DEVICES

[76] Inventor: Georges Charondiere, 1 rue Jules Ferry, Bonson 42160 Andrezieux Boutheon, France

[21] Appl. No.: 340,465

[22] Filed: Apr. 19, 1989

[30] Foreign Application Priority Data

Apr. 27, 1988 [FR] France .................................. 88 05944

[51] Int. Cl.⁵ ................................................ F16B 7/00
[52] U.S. Cl. ..................................... 403/297; 403/295; 403/5
[58] Field of Search ....................... 403/297, 292, 5, 15, 403/286, 277, 34, 36, 37, 295

[56] References Cited

U.S. PATENT DOCUMENTS

| 2,214,177 | 9/1940 | Raybould | 403/297 |
|---|---|---|---|
| 2,644,553 | 7/1953 | Cushman | 403/5 |
| 2,870,881 | 1/1959 | Rogge | 403/5 |
| 3,437,362 | 4/1969 | Offenbroich | 403/297 |
| 4,368,996 | 1/1983 | Davis et al. | 403/5 |
| 4,657,426 | 4/1987 | Targetti | 403/295 X |
| 4,722,633 | 2/1988 | Bergheim et al. | 403/5 X |

Primary Examiner—Peter M. Cuomo
Attorney, Agent, or Firm—Eric P. Schellin

[57] ABSTRACT

An expandable connector to axially join tubular elements. The connector consists of two confronting hollow parts dimensioned to fit into the ends of axially aligned tubular elements. The parts define together a void having an inflatable elastic casing. The casing is pressurized when the tubular elements are in alignment and the hollow parts are in connecting relationship therein. The parts are thereby driven internally against the end portion of the tubular elements in wedge-like manner.

2 Claims, 2 Drawing Sheets

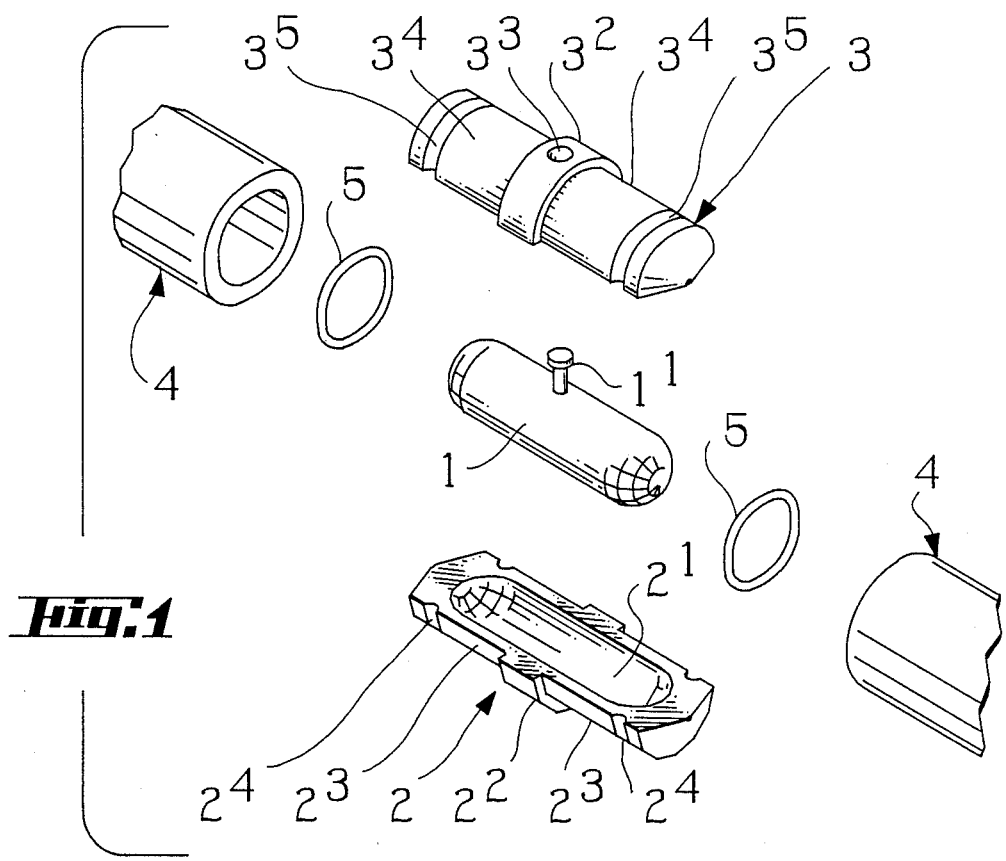
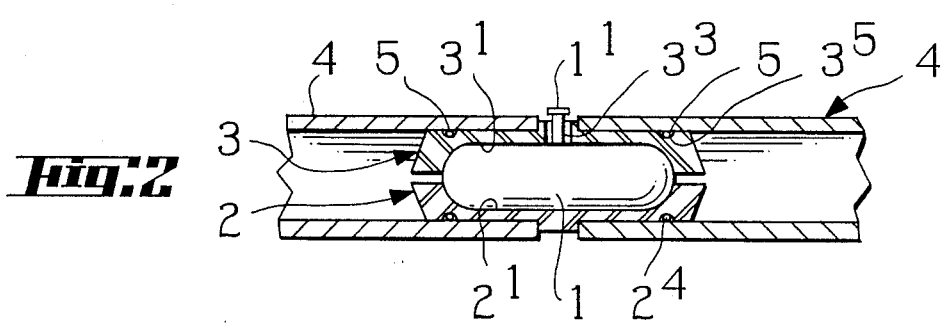
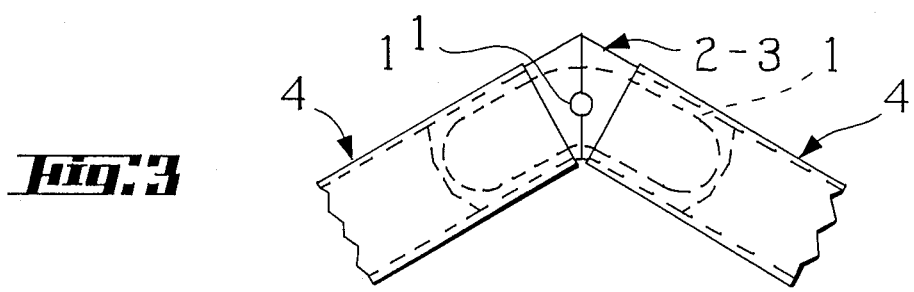

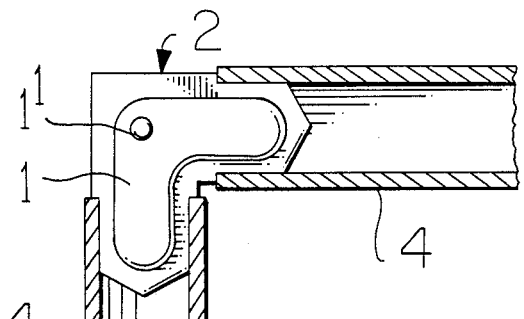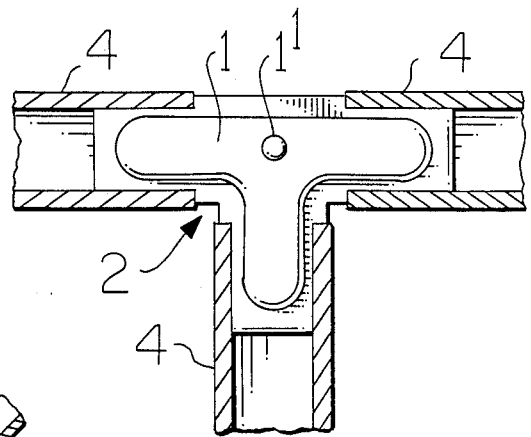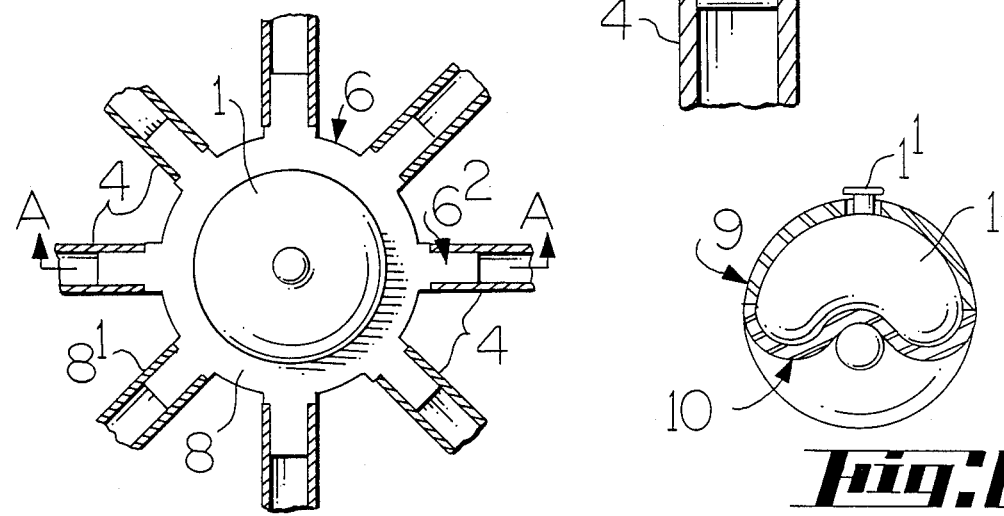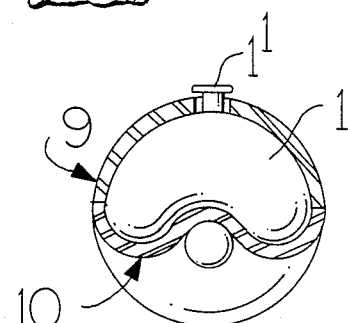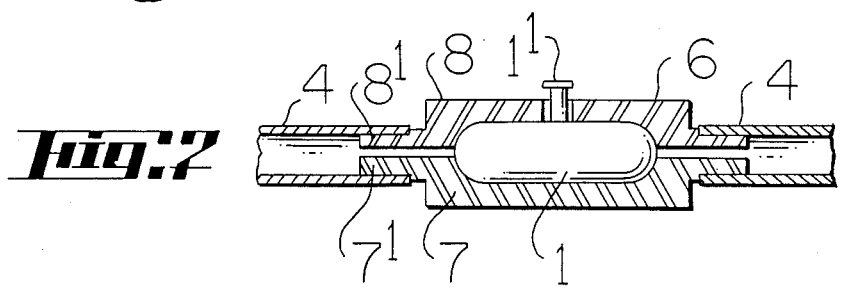

EXPANDABLE CONNECTOR TO AXIALLY JOIN TUBULAR DEVICES

BACKGROUND OF THE INVENTION

The invention relates to a device for the rapid assembling of connecting elements for structures, frameworks, supports and other assemblies.

For the designing of structures, frameworks and assemblies of tubular or non-tubular bars and of other elements of the same type, fittings, joints, sleeves and similar connection means are used. In general, these fittings and joints consist of half-shells which are shaped to the desired shape and size of the tube or the like to be clamped therein and connected by one or more connecting, closing and interlocking elements. The half-shells are internally partially engaged within the elements to be assembled. To ensure the fastening and the holding, connecting screws are used which permit by unscrewing a spacing apart of the half-shells in order to provide the expansion thereof and therefore an interlocking of the elements joined side by side. These half-shells may be made of light alloy, plastics or other materials. Such joining and connecting means have several disadvantages. A time consuming step is involved by the secure tightening up of the screw, and moreover it happens frequently that the screws get lost. First of all, this system does not allow for a suitable distribution of the pressure along the entire periphery of the assembling body. Besides, parts with quite particular shapes are required by the design of the various connecting systems, with an increase in the costs of manufacture for the molds as a result.

The purpose aimed at in accordance with the invention was the elimination of these drawbacks, and the implementation of a simple system for the embodiment of a novel design for clamping the two half-shells of the connecting device.

SUMMARY OF THE INVENTION

According to a first characteristic, this device includes an inflatable casing inserted within an intermediate assembly of two half-shells the shapes and contours of which are varying in dependence on the parts or elements to be assembled, the two half-shells being engaged partially within said elements with the possibility of being spaced apart from another one when the casing is inflated and expanded, whereby there is provided an interlocking as well as a clamping of the assembled parts.

BRIEF DESCRIPTION OF THE DRAWINGS

These and further characteristics will be clearly apparent from the following description.

For a better understanding of the disclosure, the invention will be set forth in an illustrative and not limited manner with reference to the attached drawings, in which:

FIG. 1 is a perspective view of the device in accordance with the invention, seen in an exploded view prior to being mounted.

FIG. 2 is a longitudinal cross-sectional view of the device after mounting in accordance with FIG. 1, in an example of assembly.

FIGS. 3, 4, 5 and 6 are views which illustrate some non limitative forms of connection, in accordance with oblique angulations, T-like normal arrangements or or arrangements of connecting cakes with a plurality of arms.

FIG. 7 is a cross-sectional view in accordance with line A—A of FIG. 6.

FIG. 8 is a view of a diagrammatical nature, illustrating a further assembly profile of half-shells with varying shapes.

DETAILED DESCRIPTION OF THE INVENTION

In order to make the object of the disclosure more readily understood, the invention will be described now, not limitatively, as illustrated in the Figures of the drawings.

In actual use, the assembling and connecting device consists of an inflatable casing (1) of the inner tube type, such as bladder, air tube inserted within an intermediate assembly of two half-shells with shapes and contours varying in accordance with the requirements and the parts to be assembled, these two half-shells (2-3) being engaged partially within the parts (4) to be assembled, and these half-shells are capable of being spaced apart from one another with the expansion of the inflatable casing, providing thereby a fiable and uniform interlocking which results in a distribution of the pressures along the entire assembly.

The inflatable casing (1) is provided therefor with an air jet valve (1.1.) of ready access. The two half-shells are made of any desired materials, such as light alloy, plastics and the like. These two half-shells can be of an identical and symmetrical shape as illustrated in FIG. 1, with external contours that are capable of being adapted faultlessly to the shapes, profiles and internal measurements of the parts to be assembled. Alternately, the two half-shells can have a different shape, e.g. in accordance with FIG. 8, while being capable of a faultless integration within the parts to be assembled.

Referring now to the Figures of the drawings, the device as disclosed, in accordance with FIGS. 1 and 2, includes two-half-shells (2-3) of tubular elongated shape having each one internally a recess ($2^1$-$3^1$) with a wall for housing, centering and holding the inflatable casing (1) while defining the expansible volume thereof. One at least of the two half-shells (3) is for instance provided with a transverse bore or opening ($3^3$) for the passage of the valve ($1^1$) of the casing. The two half-shells have a central flange or bearing portion ($2^2$-$3^2$) extending on either side with bearing portions ($2^3$-$3^4$) of smaller section fitting into the elements to be connected and assembled. As illustrated, the opening ($3^3$) for the passage of the valve is provided on the central bearing portion ($3^2$). In order to provide an interconnection of the two half-shells, annular half-grooves ($2^4$-$3^5$) are formed externally and transversely on each one of these half-shells, said half-grooves being arranged opposite two by two, and allowing for the passage of O-ring seals (5) or the like, having some elasticity in dependence on the inter-expansion capacity of half-shells to one another under the inflating action of the casing. There may be contemplated other assembling means for two half-shells, which would be suitable for holding them securely and for preserving the elasticity, taking into account the expansibility of these half-shells following the inflation of the casing.

The elements to be assembled come into abutment against the lateral edges of the medial bearing portions ($2^2$-$3^2$) mentioned above.

Moreover, the recesses (2¹-3¹) formed within the shells are provided with an abutment forming, peripheral banding or belting, permitting the positional securing of the casing and making it possible to limit the longitudinal expansion thereof, causing thereby this casing to expand in the direction of other planes, more particularly for spacing apart the two half-shells. The inflating means can be a pump or a similar equipment. The force of the clamping pressure which is thus obtained may be adjusted as desired.

Without departing from the scope of the invention, it is possible to adapt the assembling device to any form of connection. With reference to FIG. 3, there are used two half-shells which, instead of being placed within a longilinear plane of connection, form an angulation α. For standardizing purposes, there will be the possibility to select advantageously some leading angulations, such as 150°, 120°, 90°, 135°, 60°, 45°, and other ones, the half-shells being manufactured by means of cast molding, heat forming or injection molding, in accordance with the type of the component materials. Moreover, in order to secure the joining of the assembled elements, the medial bearing portion of each half-shell is shaped in a manner adapted to the necessary contours. Possible T-shaped and L-shaped connecting contours are illustrated in FIGS. 4 and 5. Assembly cakes (6) with a plurality of arms (6²) are illustrated in FIGS. 6 and 7. The two half-shells (7-8) have then a disc-shaped section with or without radial extensions (7¹-8¹) for integration within said arms (6²). The inflatable casing is disposed within the central recessed portion of each disc. In the case where the arms are arranged internally for receiving a portion of the casing, the distribution of the pressures takes place also along the receiving arms of the elements to be assembled.

As an alternative, FIG. 8 illustrates a particular shape of the two half-shells (9-10). One of them at least has more particularly a W-shaped contour with harmonious and rounded outlines, enabling one or more electric wires for instance to be centered and positioned from the outside.

Many advantages are offered by the invention, more particularly concerning the simplicity of the assembly, as well as the uniform pressure exerted on each part and point of assembly. The device can be used for any system of connection and assembly with joint, sleeves, cakes and the like.

I claim:

1. A connector for fixedly securing end portions of at least two tubular means and being positionable within bores of each of said end portion of each said tubular means comprising an elongated first half shell and an elongated second half shell and being dimensioned to fit internally of said end portions of said two tubular means, each of said half shells having an elongated axially disposed recessed wall, said first half shell and said second half shell when in connector use being in confronting relationship whereby the recessed wall of said first half shell and the recessed wall of said second half shell define a void, an inflatable casing positioned in said void and being dimensioned to exert substantially uniform pressure against each of said recessed walls of each of said half shells thereby radially forceably thrusting apart each half shell internally of said end portions of said at least two tubular means to frictionally engage the said connector to the internal end portions of said two tubular means and thereby effectuating connection of said tubular means, said half shells together having a substantially centrally located radially extending flange dimensioned larger than said bores of each said end portion of each of said tubular means, said flange of at least one said half shell having a transverse bore to communicate internally of said void and said casing having a valve passing through said transverse bore to provide access internally of said casing whereby said casing may be pressurized through said valve.

2. The connector of claim 1 wherein the halfshells are held together by spaced elastic gasket bands externally of the shells that is internal of the end portions of the tubular means when said connector is employed.

* * * * *